Patented Nov. 12, 1935

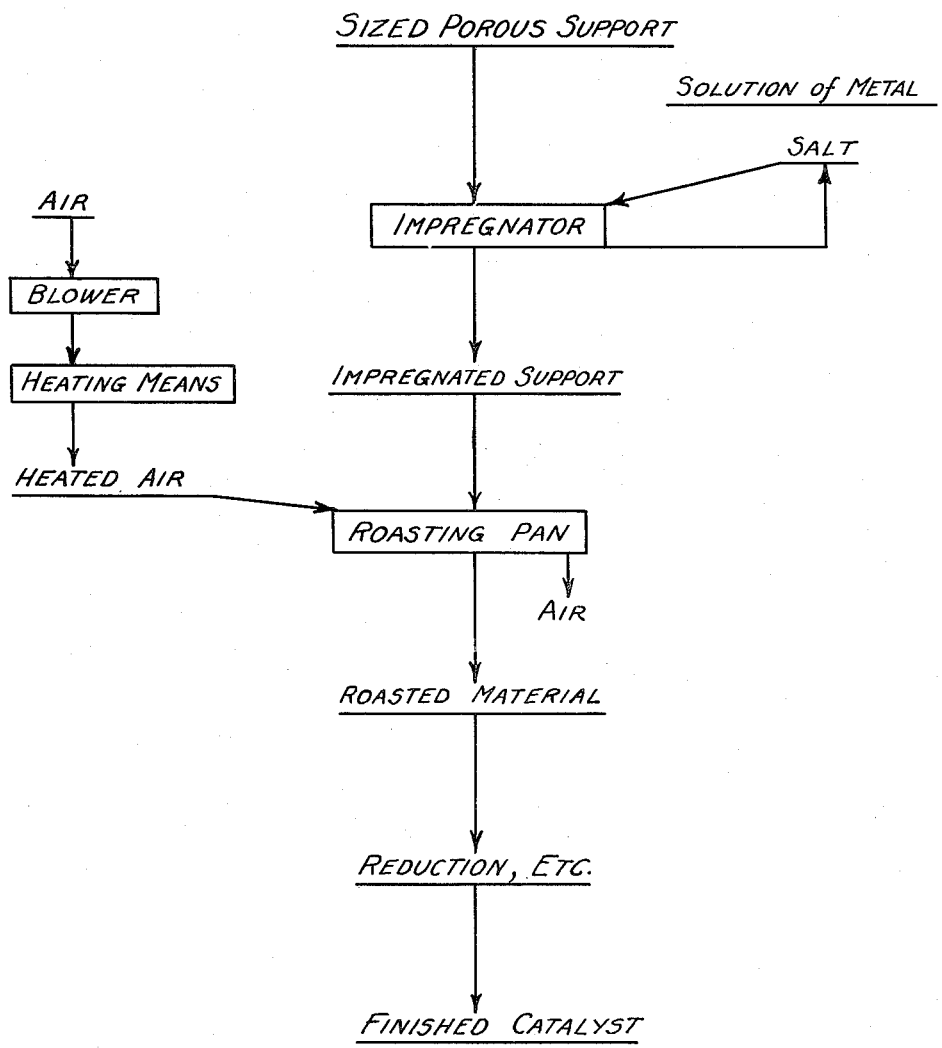

2,020,411

UNITED STATES PATENT OFFICE 2,020,411

PROCESS OF MAKING CATALYSTS

Paul S. Greer, Charleston, W. Va., assignor to Carbide and Carbon Chemicals Corporation, a corporation of New York Application December 11, 1931, Serial No. 580,396

4 Claims. (Cl. 23—233)

This invention is an improved process for making catalysts. The process broadly comprises the preparation of catalytic materials consisting of metals or metallic compounds which are supported on inert carriers by immersing the carrier in a hot concentrated solution of a soluble salt of the metal or metals for a short time, draining and drying the impregnated carrier and then roasting, reducing, oxidizing or otherwise treating the impregnated material to convert the metallic salt or salts into the form of the metal or metals which is to be the catalyst.

Many processes have been proposed for forming catalysts for various purposes which comprise metals or their derivatives. In general, it has been found that the degree of success attendant upon catalytic chemical processes is at least partially controlled by the method of preparing the catalyst as well as upon the other conditions of the process. It is not uncommon to utilize inert materials as supports for metallic catalysts but previously known processes for making catalytic agents so supported have had certain disadvantages. Practically all of such methods include the step of impregnating the support with the metal in a suspended form or in solution as a salt. Therefore, it was considered essential to use a highly concentrated liquid phase in order to secure an adequate deposit of metal on the support. A common method of doing this consists in agitating the supporting material in a solution of a metallic compound while the solution is being evaporated to a more concentrated form or to dryness. This procedure is wasteful, the support is unevenly impregnated, the equipment required is expensive and subject to undue corrosive influences, and the form of the metal obtained by the process may not always be converted readily into the final form desired.

Also, the common method of converting the metallic salt with which the support was impregnated into oxides or other usable form of the metal consisted in roasting the material in metallic containers or pans. In such methods the heat was applied through the metallic walls of the container, and as a result portions of the material were subject to overheating while other portions were insufficiently heated. Thus, the oxide coating obtained was frequently uneven and non-adhering, and various degrees of oxidation were present throughout various portions of the mass.

The principal object of my invention is to minimize the above objections and to provide a novel process for making metal catalysts which is simple, economical and efficient.

I achieve the object of my invention and produce an improved catalyst, in less time than is required by known methods, by the following procedure:

The supporting material or catalyst carrier is impregnated by immersing it in a hot solution containing the metal or metals which are to comprise the catalyst. The solution is preferably very concentrated, in fact that degree of concentration which approaches super-saturation or incipient crystallization is generally preferred. The support, after immersion, is then removed, drained and dried.

The dried impregnated material is then treated to convert the contained metallic salts into their oxides. This is done by applying the heat directly to all parts of the material by means of a heated fluid, and preferably by passing a blast of heated air through the impregnated material. I have found that an improved oxide coating having excellent adherent properties is obtained if hot air roasting only is employed. The oxide coated support is then ready for use. It may be treated with reducing, chlorinating, oxidizing or other agents or conditions to secure the form of metal desired as the final catalyst, or it may be used in the degree of oxidation obtained by roasting.

One embodiment of my invention is described in detail in the following example and illustrated by the accompanying flow sheet.

A quantity of porous artificial filter stone composed essentially of silica was crushed and sized by sifting it through a 7/16 inch screen onto a 1/8 inch screen. The sized catalyst support was then placed in a screen wire basket which was of such a size as to permit it to fit within a vat composed of corrosion resisting metal and provided with heating means in the form of a gas burner. The vat was filled or nearly filled with a solution made by dissolving $Cu(NO_3)_2 \cdot 3H_2O$ which was concentrated to incipient crystallization, and maintained at about 160° C. The screen basket containing the support material was placed within the vat for a short time. It was then removed and allowed to drain and dry.

The dried impregnated material was then placed in the roasting pan. The roasting pan was shallow and had a false wire screen bottom. The impregnated material was placed in the pan on the screen to a depth of about 6 inches. A connection was provided to the bottom of the pan so that air which was forced by a blower through the tubes of a gas-fired muffle furnace could be admitted beneath the false screen bottom of the pan to roast the impregnated material therein. The heated air at about 400° C. was blown through the bed of material until the evolution of nitrous fumes had ceased.

The roasted material was then removed from the pan. The support was now covered with a thick, adherent coating of black, mossy copper oxide. Since the catalyst being prepared was intended for use in the form of the metal, this roasted material was screened to eliminate dust, placed in a converter and reduced to the metal. This may be done by passing a stream of hydrogen at 200° to 400° C. through the catalyst, or a stream of alcohol vapors, etc. may be used for the reduction.

It is essential in preparing catalysts of this type in which nitrates are used to eliminate all nitrogen in the roasting process. Otherwise undesirable side reactions may take place when the catalyst is used. For example, if a copper catalyst as described is used to dehydrogenate alcohols, ammonia may be formed in the process if all nitrogen is not eliminated. In general, I prefer to conduct the roasting process with air heated to about 300° to 700° C.

Many advantages are gained by the use of my new process: A few of these advantages are as follows: first, the catalyst support is quickly and evenly impregnated; second, the catalyst is not impaired or subject to poisoning in the roasting operation since with the exception of the screen, only heated air is in contact therewith; and third, the oxide coating produced by hot air roasting is more easily converted to the final form of the metal desired as the catalyst. I have found, in connection with the third point listed above, that as a result of the combination of uniform impregnation with hot air roasting the catalyst support is covered with a very thick and uniform spongy, adherent coating of active oxide.

The process is applied to the production of catalysts of any kind which are composed of inert carriers or supports having metals or metallic derivatives carried thereby or supported thereon. Reduced copper and nickel catalysts, mixed catalysts which include reduced metals and may include non-reducible oxides, such as chromic oxide, and many other catalysts may be prepared by the new process in improved form. In case a catalyst is desired which contains more metal or metallic derivative than that resulting from a single dipping operation, the impregnating process may be repeated, preferably after partial or complete roasting of the impregnated material.

I claim:—

1. Process for making catalytic materials composed of metallic catalysts supported on inert carriers which comprise immersing the carrier in a hot solution of soluble metal salts concentrated to a point of incipient crystallization, draining and drying the carrier after immersion, converting the metal salts deposited on said carrier to oxides by uniformly roasting by means of a blast of preheated air, and finally converting the metal oxides on said roasted carrier into the form of the metal desired as the catalyst.

2. Process for making catalytic materials composed of metallic catalysts supported on inert carriers which comprises immersing an inert porous carrier in a hot solution of soluble metal salts concentrated to a point of incipient crystallization, draining and drying the carrier after immersion, converting the metal salts deposited on said carrier to oxides by roasting the dried carrier by means of a blast of air uniformly preheated to between about 300° and 700° C., and finally converting the metal oxides on said carrier into the form of the metal desired as the catalyst.

3. Process for making a catalytic material comprising reduced copper supported on an inert carrier which comprises immersing an inert porous carrier in a solution made by dissolving copper nitrate trihydrate which is concentrated to incipient crystallization and heated to about 160° C., draining and drying the carrier after immersion, converting the copper nitrate on said carrier into copper oxide by uniformly roasting the dried carrier in a blast of air heated to between about 350° and 600° C. and reducing the copper oxide on said roasted material to metallic copper in a stream of hydrogen at about 200° to 400° C.

4. Process for making catalytic materials composed of metallic catalysts supported on inert carriers which comprises impregnating the carrier with metal salts by immersing the same in a hot solution of the salts concentrated to the point of incipient crystalization, converting the metal salts on said carrier into oxides by roasting at a uniform temperature by means of a blast of preheated air, and finally converting the metal oxides on said carrier into the form of the metal desired as the catalyst.

PAUL S. GREER.

CERTIFICATE OF CORRECTION.

Patent No. 2,020,411. November 12, 1935.

PAUL S. GREER.

It is hereby certified that error appears in the printed specification of the above numbered patent requiring correction as follows: Page 2, second column, line 8, claim 1, for "comprise" read comprises; line 38, claim 3, for "in" read by means of; and same line, for "heated" read preheated; line 48, claim 4, for "crystalization" read crystallization; and that the said Letters Patent should be read with these corrections therein that the same may conform to the record of the case in the Patent Office.

Signed and sealed this 7th day of January, A. D. 1936.

Leslie Frazer (Seal). Acting Commissioner of Patents.